E. C. EATON.
GANG-PLOW.
No. 172,403. Patented Jan. 18, 1876.
Fig: 1.
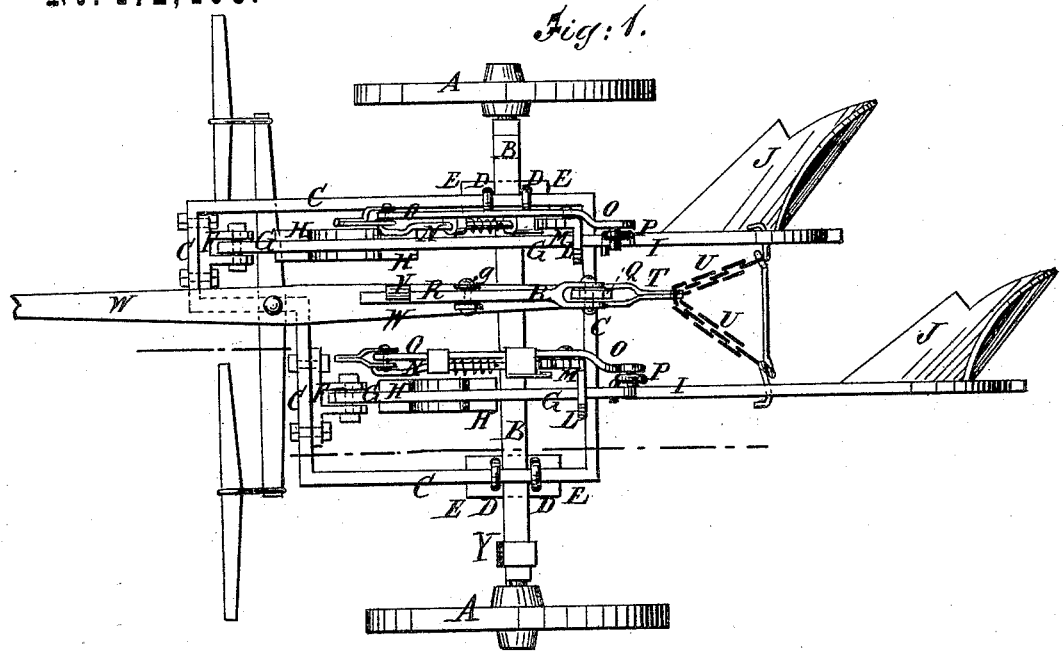
Fig: 2.
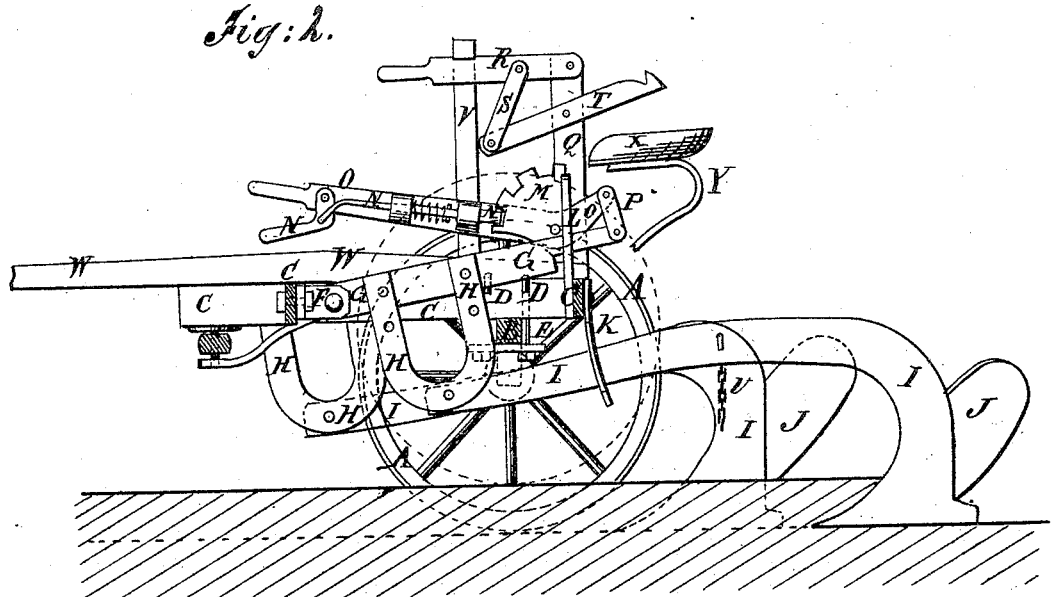
WITNESSES:
Chas. Nida
A. F. Perry
INVENTOR:
E. C. Eaton
BY Munn & Co.
ATTORNEYS.

UNITED STATES PATENT OFFICE.

ENOCH C. EATON, OF PINCKNEYVILLE, ILLINOIS.

IMPROVEMENT IN GANG-PLOWS.

Specification forming part of Letters Patent No. 172,403, dated January 18, 1876; application filed October 2, 1875.

*To all whom it may concern:*

Be it known that I, ENOCH C. EATON, of Pinckneyville, in the county of Perry and State of Illinois, have invented a new and useful Improvement in Gang-Plow, of which the following is a specification:

Figure 1 is a top view of my improved gang-plow. Fig. 2 is a vertical longitudinal section of the same, taken through the line $x\ x$, Fig. 1.

Similar letters of reference indicate corresponding parts.

The object of this invention is to furnish an improved gang-plow, which shall be so constructed that it may be readily adjusted to work deeper or shallower in the ground, which will hold the plows from lateral play when at work, and which will enable the plows to be easily raised from the ground.

The invention consists in a coupling, and the means for operating it, as hereinafter more fully described.

A are the wheels, which revolve upon the journals of the axle B. The axle B is made with an offset near the furrow-wheel, so that the frame of the machine may be held level, while one wheel runs in the furrow and the other upon the unplowed land. C is a frame, which is made rectangular in form, except that it has a forward projection or offset upon the side next the plowed land, so that the plow-beams may both be of the same length, while one of the plows is placed at the proper distance in front of the other. The frame C is secured to the axle B by hook-bolts D, which hook upon the rear part of the side bars of said frame C, pass through yokes E placed beneath the axle B, and have nuts screwed upon their lower ends, so that by loosening the said nuts the said frame may be adjusted upon the said axle, as desired. To the front cross-bar of the frame C are bolted two plates, F, having pairs of lugs upon their rear sides, to and between which are pivoted the forward ends of the levers G. The rear ends of the levers G rest upon the rear cross-bar of the frame C. To the levers G, within the frame C, are bolted the ends of the U-bars H, two to each lever, several holes being formed in the arms of the said U-bars to receive the fastening-bolts, so that the said U-bars may be raised and lowered, as desired. To and between the bends of the bars H of each pair is pivoted the forward end of a plow-beam, I, the rear end of which is turned downward, and has an ordinary turn-plow, J, attached to it. The plow-beams I pass through slotted guide-bars K rigidly attached to the rear cross-bar of the frame C, and which keep the plows from lateral movement when at work. The rear ends of the levers G are kept from lateral movement by passing through slotted guards L rigidly attached to the rear cross-bar of the frame C. To the guards L are attached, or upon them are formed, segments of circles M, having notches formed in their curved edges to receive the spring-lever pawls N attached to the long arms of the bent levers O, which are pivoted at their angles to the guards L or frame C, and the short arms of which are connected with the rear ends of the levers G by a link, P, so that by operating the bent lever O the plows may be adjusted to work deeper or shallower in the ground, the pawls N and ratchets M holding them securely in place when adjusted. To the rear cross-bar of the frame C, between the levers G, is rigidly attached an upright, Q, to the upper end of which is pivoted the end of the lever R. To the lever R, at a little distance from its pivoted end, is pivoted the end of a connecting-bar, S, the other end of which is pivoted to the forward end of the lever T. The lever T is pivoted to the upright Q at a little distance from its upper end, and upon its rear end is formed a hook to receive the links or chains U attached to the plow-beams I, so that by operating the compound lever R S T the plows may be easily raised from the ground. V is a catch-bar attached to the tongue W or frame C to receive the free end of the lever R, when lowered to raise the plows away from the ground and lock it in place, supporting the plows. The tongue W is rigidly attached to the frame C. X is the driver's seat, the standard Y of which is attached to the axle B between the frame C and the wheel A that runs upon the unplowed land.

Having thus described my invention, I claim as new and desire to secure by Letters Patent—

1. The couplings F, the levers G, and the U-bars H, in combination with the frame C and the plow-beams I, substantially as herein shown and described.

2. The combination of the guides L, the ratchets M, the lever-pawls N, the bent levers O, and the links P, with the levers G, and the frame C, substantially as herein shown and described.

ENOCH C. EATON.

Witnesses:
G. H. SLIMPERT,
JAMES B. McDONALD.